US012382987B1

(12) United States Patent
Chen

(10) Patent No.: US 12,382,987 B1
(45) Date of Patent: Aug. 12, 2025

(54) ELECTRONIC HOOKAH WITH SHEET-LIKE HEATING DEVICE

(71) Applicant: Shenzhen Impetus Technology Co., Ltd., Guangdong (CN)

(72) Inventor: Liqian Chen, Guangdong (CN)

(73) Assignee: Shenzhen Impetus Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/027,033

(22) Filed: Jan. 17, 2025

(30) Foreign Application Priority Data

Apr. 26, 2024 (CN) ......................... 202410515414.1

(51) Int. Cl.
*A24F 1/30* (2006.01)
*H05B 3/26* (2006.01)

(52) U.S. Cl.
CPC ............... *A24F 1/30* (2013.01); *H05B 3/262* (2013.01); *H05B 2203/003* (2013.01); *H05B 2203/013* (2013.01)

(58) Field of Classification Search
None
See application file for complete search history.

(56) References Cited

U.S. PATENT DOCUMENTS

| | | | | |
|---|---|---|---|---|
| 12,256,782 B2 * | 3/2025 | Chen | ........................ | H05B 3/22 |
| 2022/0346441 A1 * | 11/2022 | Ma | .......................... | A24F 40/10 |
| 2024/0023601 A1 * | 1/2024 | He | ............................ | A24F 1/30 |

* cited by examiner

*Primary Examiner* — Dennis R Cordray

(57) ABSTRACT

Disclosed is an electronic hookah with a sheet-like heating device, which is used for heating a tobacco material, and includes a main unit. The main unit is provided with a sheet-like heating element, and a protective cover arranged on one side of the sheet-like heating element facing the tobacco material. During heating, the sheet-like heating element uniformly conducts heat to the tobacco material through the protective cover and heats the tobacco material and surrounding air. With the sheet-like heating element and the protective cover, convenient temperature control is achieved, and the tobacco material can be uniformly heated, thereby avoiding the problems that the tobacco is scorched due to excessively high charcoal burning temperature and insufficient smoke volume due to excessively low charcoal temperature. Moreover, the electronic hookah can be quickly heated, to generate a sufficient smoke volume, and both temperature and smoke quality can be controlled.

13 Claims, 12 Drawing Sheets

ELECTRONIC HOOKAH WITH SHEET-LIKE HEATING DEVICE

CROSS REFERENCE TO RELATED APPLICATIONS

The present application claims the benefit of Chinese Patent Application No. 202410515414.1 filed on Apr. 26, 2024, the contents of which are incorporated herein by reference in their entirety.

TECHNICAL FIELD

The present disclosure relates to the technical field of hookahs, and in particular, to an electronic hookah with a sheet-like heating device.

BACKGROUND

The electronic hookah is a baking type water-passing smoking set with an inverted heating pot, which is called "Arabia hookah" in the industry. The electronic hookah generally includes a bowl for containing cut tobacco or hookah paste and a sheet-like heating device for heating.

A charcoal burning mode is generally adopted as the heating mode of existing electronic hookahs, but the charcoal burning mode can only slowly raise the temperature, wasting the time of a user. When the burning temperature of charcoal rises too high, tobacco will be scorched. If the temperature of charcoal is too low, the smoke volume will be insufficient.

SUMMARY

In view of the aforementioned problems, an embodiment of the present disclosure is proposed to provide an electronic hookah with a sheet-like heating device which can overcome or at least partially solve the aforementioned problems.

The electronic hookah with the sheet-like heating device, which is used for heating a tobacco material, includes a main unit, where the main unit is provided with a sheet-like heating element and a protective cover;

- the protective cover is arranged on one side of the sheet-like heating element facing the tobacco material; and
- during heating, the sheet-like heating element uniformly conducts heat to the tobacco material through the protective cover and heats the tobacco material and the surrounding air.

Preferably, the electronic hookah with the sheet-like heating device further includes a second part for accommodating the tobacco material, where the main unit is connected with the second part; and the tobacco material is arranged opposite to a heating surface of the sheet-like heating element.

Preferably, the main unit is provided with a cavity for accommodating the tobacco material, and the tobacco material is arranged opposite to the sheet-like heating element.

Preferably, the main unit is connected with the second part and cooperates with the second part to define a cavity for accommodating the tobacco material; and the tobacco material is arranged opposite to a heating surface of the sheet-like heating element.

Preferably, the sheet-like heating element is made by thick-film printing and low-temperature glaze firing.

Preferably, a heat insulation assembly includes a heat insulation support and a heat insulator, where the heat insulator is arranged on one side of the heat insulation support away from the sheet-like heating element.

Preferably, the sheet-like heating element and the protective cover are mounted in the heat insulation support, and the two opposite sides of the sheet-like heating element and the protective cover are exposed out of the heat insulation support, respectively.

Preferably, a first heat insulation sheet and a second heat insulation sheet for heat insulation are arranged between the heat insulator and the heat insulation support.

Preferably, the first heat insulation sheet and the second heat insulation sheet are fixed by supporting blocks.

Preferably, the sheet-like heating element is made of a super-thermal conductivity material.

Preferably, the sheet-like heating element includes a temperature sensing device, and one end of the temperature sensing device is fixedly connected with the sheet-like heating element.

Preferably, the sheet-like heating element is provided with first air holes, and the protective cover is provided with second air holes.

The present disclosure specifically includes the following advantages:

In the embodiments of the present disclosure, with respect to the problem in the prior art that the temperature of charcoal burning cannot be controlled, the present disclosure provides the solution of the "heating device". Specifically, the electronic hookah with the sheet-like heating device, which is used for heating the tobacco material, includes the main unit. The main unit is provided with the sheet-like heating element and the protective cover, the protective cover is arranged on one side of the sheet-like heating element facing the tobacco material, and during heating, the sheet-like heating element uniformly conducts heat to the tobacco material through the protective cover and heats the tobacco material and the surrounding air. With the sheet-like heating element and the protective cover, the problem that the temperature of charcoal burning cannot be controlled is solved, the purpose of convenient temperature control is achieved, and the tobacco material can be uniformly heated, thereby avoiding the problems that the tobacco is scorched due to excessively high charcoal burning temperature and insufficient smoke volume due to excessively low charcoal temperature.

Moreover, according to the present disclosure, the electronic hookah can be quickly heated, so that a sufficient smoke volume can be generated, and both temperature and smoke quality can be controlled.

BRIEF DESCRIPTION OF DRAWINGS

In order to more clearly illustrate the technical solution of the present disclosure, the accompanying drawings which are required to be used in the description of the present disclosure will be introduced briefly below. Apparently, the accompanying drawings described below are merely some embodiments of the present disclosure, and those of ordinary skill in the art can also obtain other accompanying drawings according to these accompanying drawings without making creative efforts.

100. Electronic hookah; 1. Main unit; 10. Tobacco material; 11. First part; 110. Upper housing; 111. Upper support; 112. Battery compartment; 113. Main control board; 114, First air inlet; 12. Second part; 120. Second air inlet; 121. Air outlet; 122. Smoke generation pot; 1220. Third air outlet; 13, First air passage; 14. Second air passage; 2. Container; 3. Heating device; 30. Heating assembly; 300. Sheet-like heating element; 3001. First air holes; 301. Connecting wire; 31. Protective cover; 310. Second air holes; 32. Heat insulation assembly; 320. Heat insulation support; 3201. Heat insulation ring; 3202. Raised portion; 3203. Fastening block; 3204. Connecting pin; 321. Heat insulator; 3205. Positioning hole; 322. Mica sheet assembly; 3220. First heat insulation sheet; 3221. Second heat insulation sheet; 3222. Supporting tube; 3223. Air holes; 3224. Fixing frame; 323. Heat insulation cover; 33. Temperature sensing device.

DETAILED DESCRIPTION

In order to make the aforementioned objective, features and advantages of the present disclosure clearer and easier to understand, the present disclosure is further described in detail in conjunction with the accompanying drawings and specific embodiments. Apparently, the embodiments described are part of the embodiments of the present disclosure rather than all the embodiments. All other embodiments which are obtained by those of ordinary skill in the art based on the embodiments in the present disclosure without creative efforts shall fall within the protection scope of the present disclosure.

It has been discovered by analyzing the prior art that a charcoal burning mode is generally adopted as the heating mode of existing electronic hookahs, but the charcoal burning mode can only slowly raise the temperature, wasting the time of a user. When the burning temperature of charcoal rises too high, tobacco will be scorched. If the temperature of charcoal is too low, the smoke volume will be insufficient. In order to enable an electronic hookah to better control the temperature, the present disclosure adopts the electrical control of a sheet-like heating element for process.

Figure 1:
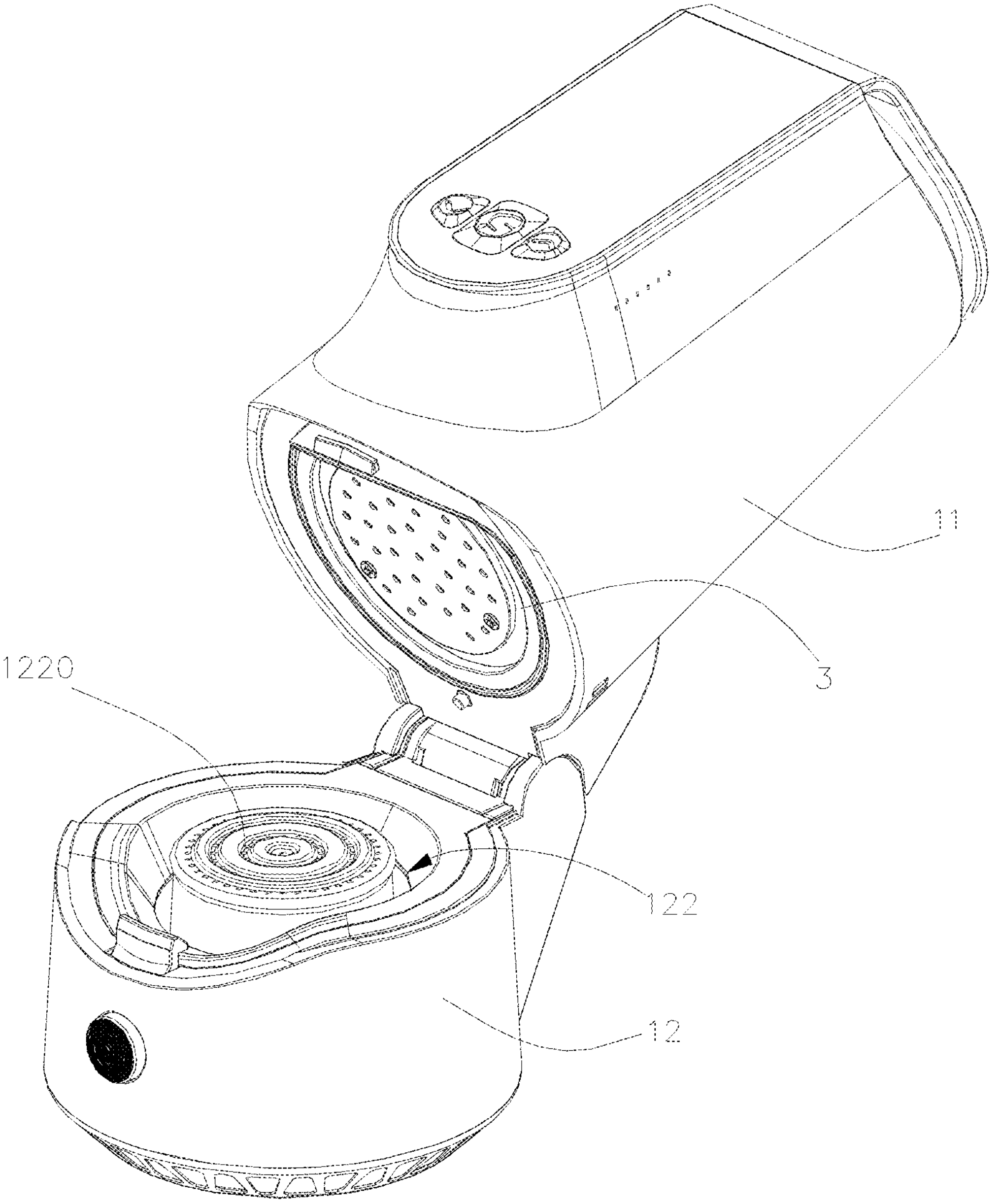
FIG. 1 is a schematic structural diagram of an electronic hookah according to the present disclosure.

FIG. 1 shows a schematic structural diagram of an electronic hookah with a sheet-like heating device according to the present disclosure. The electronic hookah with the sheet-like heating device may specifically include the following structure: The electronic hookah with the sheet-like heating device, which is used for heating a tobacco material, includes a main unit. The main unit is provided with a sheet-like heating element and a protective cover, the protective cover is arranged on one side of the sheet-like heating element facing the tobacco material, and during heating, the sheet-like heating element uniformly conducts heat to the tobacco material through the protective cover and heats the tobacco material and the surrounding air.

In the embodiments of the present disclosure, with respect to the problem in the prior art that the temperature of charcoal burning cannot be controlled, the present disclosure provides the solution of the "heating device". Specifically, the electronic hookah with the sheet-like heating device, which is used for heating the tobacco material, includes the main unit. The main unit is provided with the sheet-like heating element and the protective cover, the protective cover is arranged on one side of the sheet-like heating element facing the tobacco material, and during heating, the sheet-like heating element uniformly conducts heat to the tobacco material through the protective cover and heats the tobacco material and the surrounding air. With the sheet-like heating element and the protective cover, the problem that the temperature of charcoal burning cannot be controlled is solved, the purpose of convenient temperature control is achieved, and the tobacco material can be uniformly heated, thereby avoiding the problems that the tobacco is scorched due to excessively high charcoal burning temperature and insufficient smoke volume due to excessively low charcoal temperature. Moreover, according to the present disclosure, the electronic hookah can be quickly heated, so that a sufficient smoke volume can be generated, and both temperature and smoke quality can be controlled.

Next, the electronic hookah with the sheet-like heating device in an exemplary embodiment will be further illustrated.

Figure 14:
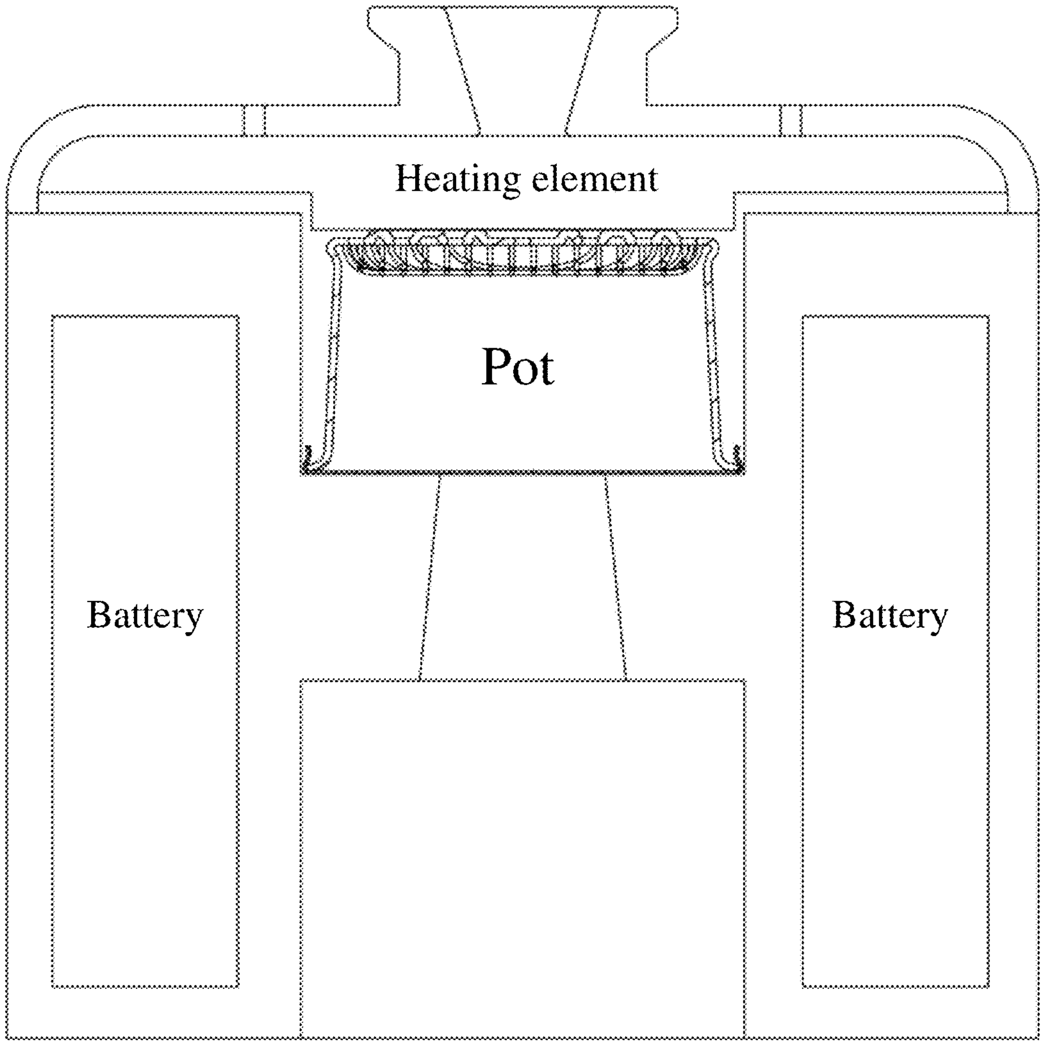
FIG. 14 is a schematic structural diagram of an electronic hookah according to the present disclosure.
Figure 15:
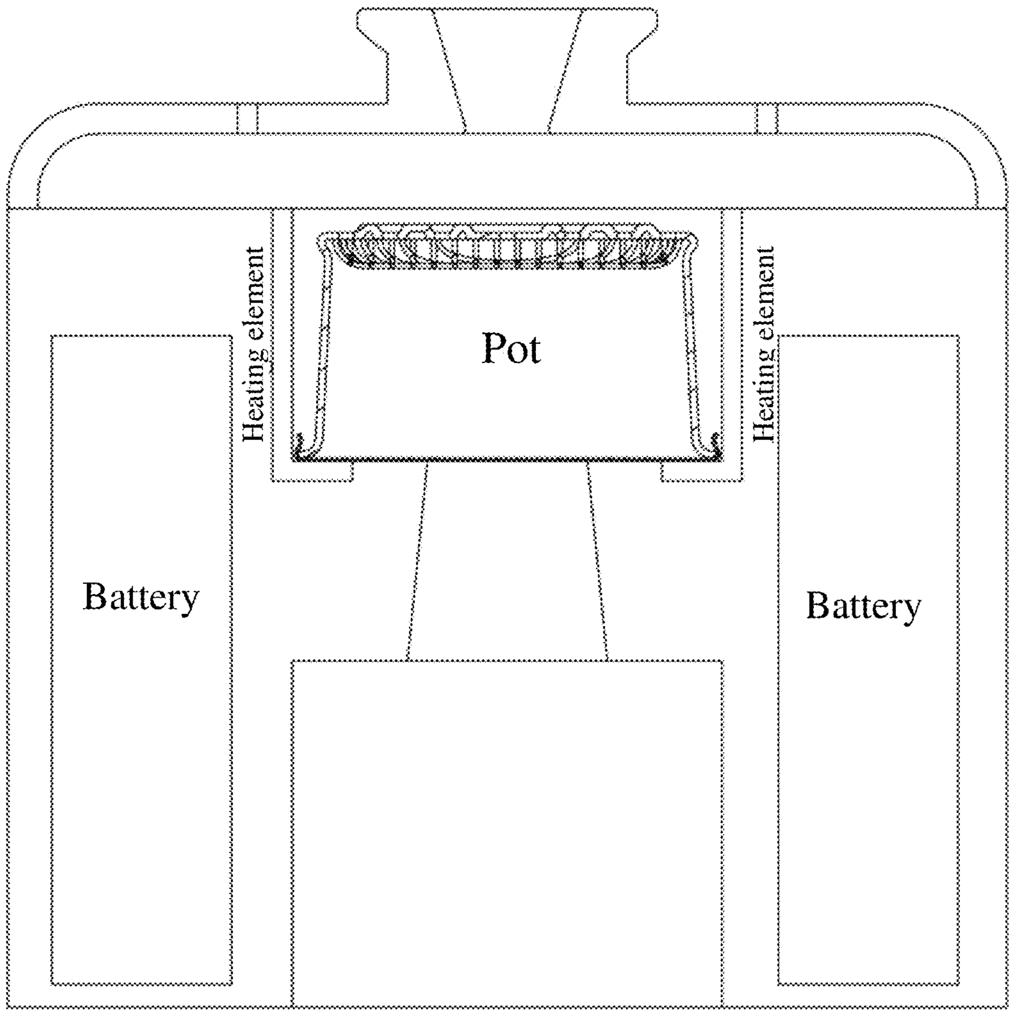
FIG. 15 is a schematic structural diagram of an electronic hookah according to the present disclosure.
Figure 16:
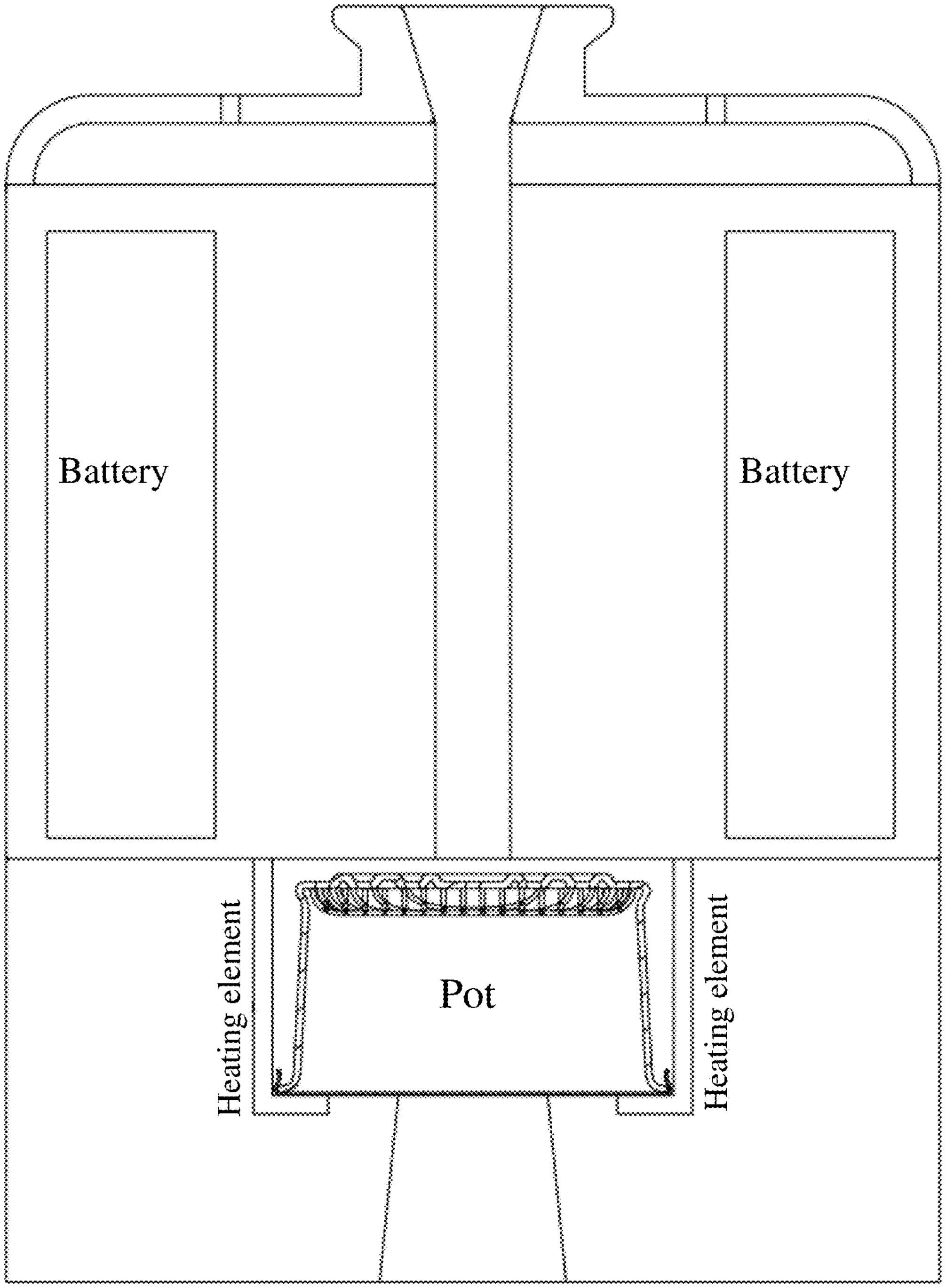
FIG. 16 is a schematic structural diagram of an electronic hookah according to the present disclosure.

In the embodiments of the present disclosure, the electronic hookah with the sheet-like heating device further includes a second part 12 for accommodating the tobacco material, where the main unit is connected with the second part 12, and the tobacco material is arranged opposite to a heating surface of the sheet-like heating element. As shown in FIGS. 14 to 16.

As an example, the main unit 1 is detachably connected with the second part 12, and the second part 12 may be arranged under the main unit 1 or on one side of the main unit 1.

As an example, the main unit 1 is fixedly connected with the second part 12, and the second part 12 may be arranged under the main unit 1 or on one side of the main unit 1.

As an example, the main unit 1 is hinged with the second part 12, and the second part 12 may be arranged under the main unit 1 or on one side of the main unit 1.

In the embodiments of the present disclosure, the main unit 1 is provided with a cavity for accommodating the tobacco material 10, and the tobacco material is arranged opposite to the sheet-like heating element 300. That is, the interior of the main unit 1 is provided with a cavity for accommodating the tobacco material. In the main unit 1, the tobacco material may be fixed in the main unit 1 or detachably placed in the main unit 1.

In the embodiments of the present disclosure, the main unit 1 is connected with the second part 12 and cooperates with the second part 12 to define a cavity for accommodating the tobacco material, and the tobacco material is arranged opposite to the heating surface of the sheet-like heating element 300.

As an example, the main unit 1 defines a half cavity for accommodating the tobacco material, the second part 12 defines a half cavity for accommodating the tobacco material, and both jointly form an electronic hookah.

Figure 11:
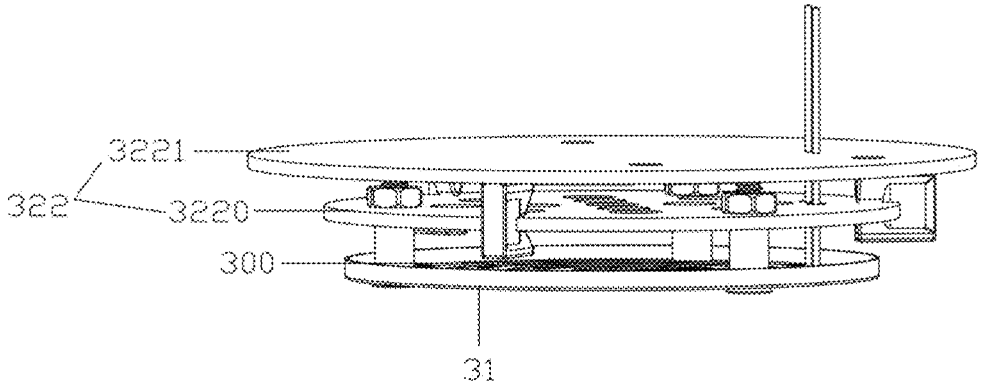
FIG. 11 is a schematic structural diagram of the mica sheet assembly and the sheet-like heating element of the electronic hookah with the sheet-like heating device according to the present disclosure.
Figure 13:
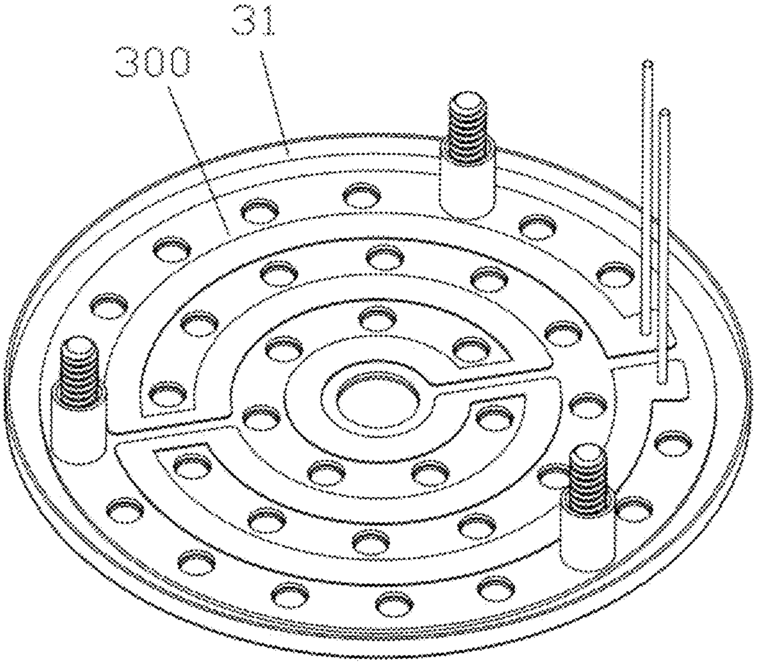
FIG. 13 is a schematic structural diagram of the protective cover and the sheet-like heating element of the electronic hookah with the sheet-like heating device according to the present disclosure.

In the embodiments of the present disclosure, as shown in FIGS. 11 and 13, the main unit is provided with the sheet-like heating element 300 and the protective cover 31, the protective cover 31 is arranged on one side of the sheet-like heating element 300 facing the tobacco material, the shape of the protective cover 31 is adapted to the shape of the sheet-like heating element 300, the protective cover 31 wraps the sheet-like heating element 300, and the protective cover 31 is a steel cover.

Figure 12:
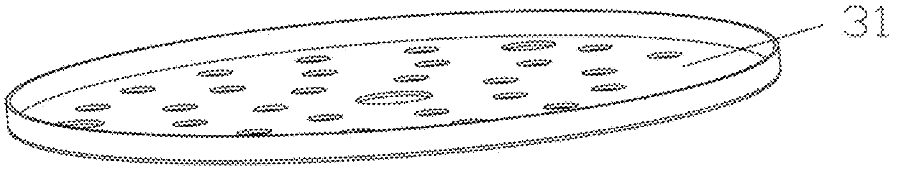
FIG. 12 is a schematic structural diagram of a protective cover of the electronic hookah with the sheet-like heating device according to the present disclosure.

As an example, the protective cover 31 is round. As shown in FIG. 12, the circumference of the protective cover 31 is provided with a sidewall which is larger than the height of the sheet-like heating element 300, and the sidewall can effectively wrap the sheet-like heating element 300. The protective cover 31 of the sheet-like heating element 300 is mainly used for protecting the sheet-like heating element from the influence of an outside environment, and thus, prolonging the service life of the sheet-like heating element. The specific functions include: preventing attachment of dust and dirt: Since the sheet-like heating element will generate a lot of heat during operation, if dust and dirt attach to the surface of the sheet-like heating element, the effect of heat dissipation will be affected, causing the sheet-like heating element to overheat and shorten the service life. The protective cover can effectively block the entry of dust and dirt, keeping the surface of the sheet-like heating element clean. preventing oxidation and corrosion: Since the sheet-like heating element will generate high temperature during operation, if exposed to the air, the sheet-like heating element will easily react with oxygen, leading to oxidation and corrosion. The protective cover can isolate the air to reduce the possibility of oxidation and corrosion, thus prolonging the service life of the sheet-like heating element. improving safety: The protective cover can prevent an operator from directly touching the sheet-like heating element, reducing the risk of scalding and electric shock, so the safety of operation is improved. The protective cover 31 of the sheet-like heating element 300 plays an important role in protecting the sheet-like heating element 300, prolonging the service life, and improving safety.

In a specific embodiment, the sheet-like heating element 300 further includes the heating of air. A principle of smoke generation is that the air is heated by first air holes 3001 in the sheet-like heating element 300 and then enters a tobacco chamber through third air holes 1220 in a pot body 1, the tobacco material is heated to a specified temperature by the hot air, and the cold air at the bottom then blows onto the hot tobacco material to generate a convection between the cold air and the hot air, thus generating smoke. By heating the air and introducing the air into the tobacco chamber through the first air holes 3001 and the third air holes 1220, the sheet-like heating element 300 heats the tobacco material to generate smoke. This principle of smoke generation is to use the convection between the hot air and the cold air to generate smoke.

Specifically, the sheet-like heating element 300 heats the air, causing the temperature of the air to rise. Then, the heated air enters the tobacco chamber through the first air holes 3001. Since the tobacco material in the tobacco chamber has been placed in advance, the heated air will come into contact with the tobacco material. Since the temperature of the tobacco material is relatively low, the hot air will transfer heat to the tobacco material, causing the temperature of the tobacco material to rise. At the same time, the cold air at the bottom is introduced into the tobacco chamber through the third air holes 1220. After the cold air contacts the hot tobacco material, the hot tobacco material will transfer heat to the cold air due to relatively low temperature, thus generating a convection between the cold air and the hot air. This convection between the cold air and the hot air will generate smoke, so that ingredients in the tobacco material are evaporated and form smoke. The sheet-like heating element 300 generates smoke by heating the air and utilizing the convection between the cold air and the hot air, thus achieving the purpose of smoke generation. This principle of smoke generation can effectively evaporate the ingredients in the tobacco material and generate smoke, thereby improving the smoking experience.

In the embodiments of the present disclosure, the sheet-like heating element 300 is made by thick-film printing and low-temperature glaze firing. The sheet-like heating element 300 is made by thick-film printing and low-temperature glaze firing, which means that a heating material is printed on a substrate by the thick-film printing technique and then sintered at a relatively low temperature, so that the heating material and the substrate are firmly combined to form a device with a heating function. This technique can increase the accuracy and uniformity of the sheet-like heating element 300 and reduce the production cost and energy consumption. Specifically, the sheet-like heating element 300 is made by first making a layer of insulation on a metal sheet, then printing a heating circuit thereon by thick-film printing, and preferably making a layer of low-temperature glaze for covering. The sheet-like heating element 300 may also be replaced by other heating sources, such as a ceramic heating sheet, a metal etched sheet, or a silicon carbide heating sheet.

As an example, the sheet-like heating element 300 is made of a super-thermal conductivity material. Specifically, the sheet-like heating element 300 is made of SUS430 super-thermal conductivity material, which is a ferritic stainless steel with good corrosion resistance and high-temperature strength. Due to its unique crystal structure and chemical composition, SUS430 has excellent oxidation resistance and corrosion resistance while maintaining high thermal conductivity. Therefore, SUS430 is widely applied in various places requiring efficient heat transfer and corrosion resistance, such as heat exchangers, heaters, and condensers. The thermal conductivity of SUS430 is about 16.7 W/(m·k), which is lower than that of conventional metal materials such as copper and aluminum, but higher than that of stainless steel and other ferritic stainless steels. Therefore, SUS430 is an ideal super-thermal conductivity material. However, the thermal conductivity of SUS430 is affected by its surface state and processing technology. Therefore, when SUS430 is selected as the super-thermal conductivity material, the present disclosure adopts thick-film printing and low-temperature glaze firing for proper surface treatment and processing. The super-thermal conductivity material refers to a material with high thermal conductivity under a superconducting state. Superconduction refers to a phenomenon that the resistance of a material suddenly drops to zero below a certain critical temperature. Under this state, the material can transfer heat without loss. Super-thermal conductivity materials are mainly used for efficient heat transfer and heat dissipation management. Common super-thermal conductivity materials include metals with high conductivity, such as silver, copper, and aluminum, and some alloys and compounds, such as niobium-titanium alloy and niobium-tin alloy. In recent years, novel materials, such as graphene, have also attracted extensive attention for their excellent thermal conductivity.

In the embodiments of the present disclosure, a heat insulation assembly 32 includes a heat insulation support 320 and a heat insulator 321, where the heat insulator 321 is arranged on one side of the heat insulation support 320 away from the sheet-like heating element 300.

Figure 9:
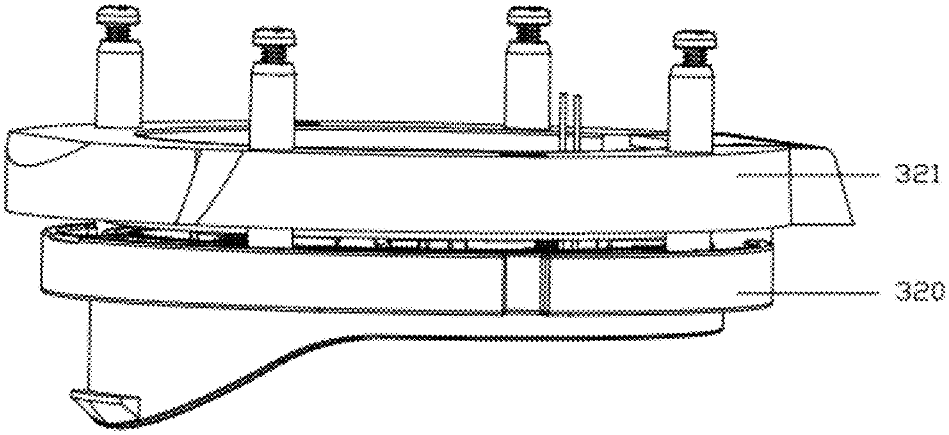
FIG. 9 is a schematic diagram of the overall structure of the electronic hookah with the sheet-like heating device according to the present disclosure.

As an example, as shown in FIG. 9, the heat insulation support 320 includes a circular heat insulation ring 3201 and a tongue-shaped protruding portion 3202 protruding from one side of the heat insulation ring 3201. A plurality of connecting pins 3204 extend from one side of the heat insulation ring 3201 facing away from the protruding portion 3202. The protruding portion 3202 protrudes toward the side opposite to the heat insulation cover 323, and fastening blocks 3203 of an opening and closing structure of the main unit 1 are arranged on the outer surface of the protruding portion 3202. The plurality of connecting pins 3204 are in one-to-one correspondence to a plurality of positioning holes 3205 and pass through the heat insulator 321 through the corresponding positioning holes 3205 to play a supporting role. The outer edge of the heat insulation support 320 is provided with a plurality of fixing holes.

In a specific embodiment, the raised portion 3202 is used for connecting a part, accommodating the tobacco material, of the main unit.

In the embodiments of the present disclosure, a heat insulation sheet assembly 322 is arranged between the heat insulator 321 and the heat insulation support 320. The heat insulation sheet assembly 322 includes a first heat insulation sheet 3220 and a second heat insulation sheet 3221, which are fixed by supporting blocks. Both the first heat insulation sheet 3220 and the second heat insulation sheet 3221 are used for heat insulation, isolating the sheet-like heating element 300 from batteries and a mainboard to prevent short-circuiting. The heat insulation sheet assembly 322 may be a mica sheet. The heat insulation sheet assembly 322 includes a first heat insulation sheet 3220 and a second heat insulation sheet 3221, which are fixed by supporting blocks. Both the first heat insulation sheet 3220 and the second heat insulation sheet 3221 are used for heat insulation to prevent the sheet-like heating element 300 from being short-circuited with the batteries and the mainboard. The heat insulation sheet assembly 322 may be a mica sheet, but may also be other materials with good heat insulation performance.

Figure 10:
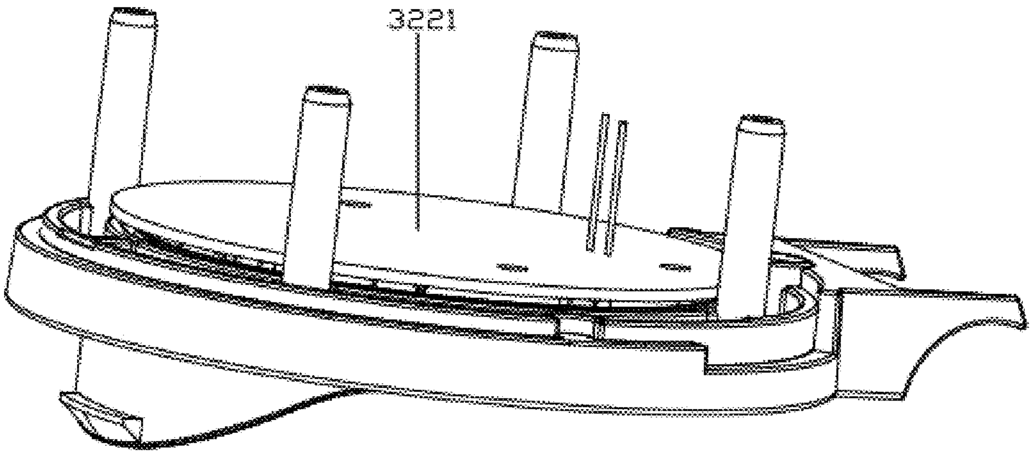
FIG. 10 is a schematic structural diagram of a second heat insulation sheet of the electronic hookah with the sheet-like heating device according to the present disclosure.

In a specific embodiment, as shown in FIG. 10, the mica sheet assembly 322 is usually used as a heat dissipation material in electronic equipment. The mica sheet assembly 322 may be arranged on one side of the sheet-like heating element to help dissipate heat and prevent the equipment from overheating. As a heat conduction interface material, the mica sheet assembly 322 according to the present disclosure is placed at one side of the sheet-like heating element 300 at a certain distance from the sheet-like heating element 300. A gap between the sheet-like heating element 300 and the heat insulator 321 may be filled to improve the heat conduction efficiency and reduce the thermal resistance.

In the embodiments of the present disclosure, the sheet-like heating element 300 includes a temperature sensing device 33, and one end of the temperature sensing device 33 is fixedly connected with the sheet-like heating element 300. The temperature sensing device 33, a temperature measuring element commonly used in temperature measuring instruments, directly measures temperature and converts a temperature signal into a thermoelectromotive force signal, which is then converted into the temperature of a measured medium by an electrical instrument.

The present disclosure further includes an electronic hookah. The electronic hookah includes a second part and the electronic hookah with the sheet-like heating device as described, where the electronic hookah with the sheet-like heating device is connected with the second part, and the second part is provided with a cavity for accommodating a tobacco material, and the tobacco material is arranged opposite to a sheet-like heating element.

The present disclosure further includes an electronic hookah. The electronic hookah includes the electronic hookah with the sheet-like heating device as described, where a main unit is provided with a cavity for accommodating a tobacco material, and the tobacco material is arranged opposite to a sheet-like heating element.

Figure 2:
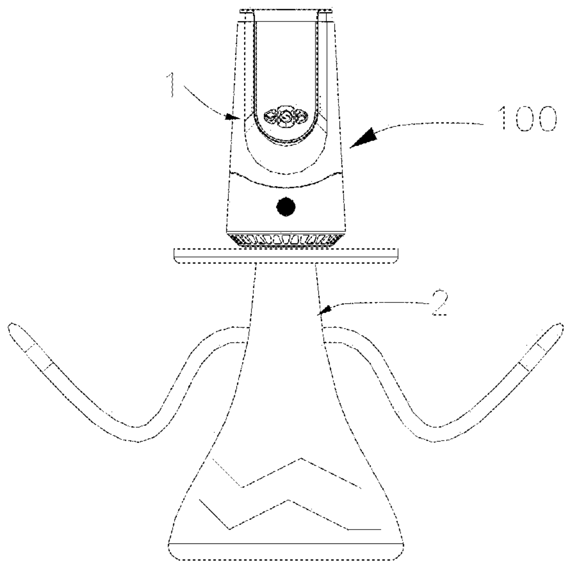
FIG. 2 is a schematic structural diagram of the electronic hookah and a container according to the present disclosure.
Figure 3:
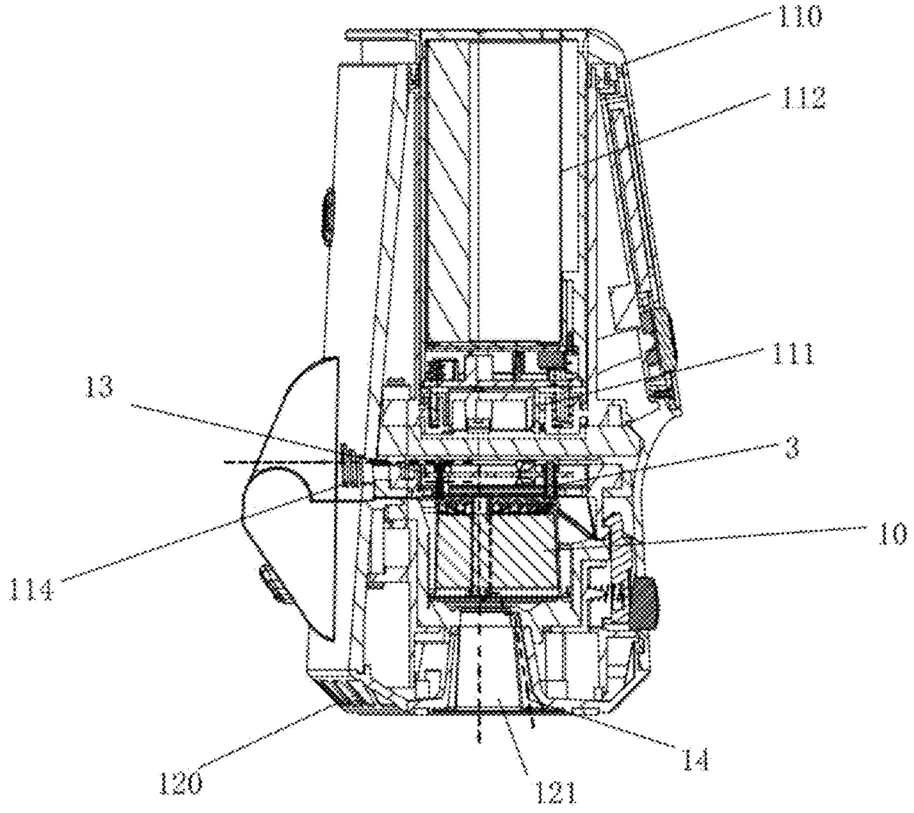
FIG. 3 is a schematic three-dimensional sectional view of the electronic hookah according to the present disclosure.

In the embodiments of the present disclosure, as shown in FIGS. 1, 2 and 3, the electronic hookah 100 includes a main unit 1, a container 2, and a heating device 3. The container 2 is assembled with the main unit 1 for accommodating filtrate.

In a specific embodiment, the main unit 1 includes a first part 11, a second part 12, a first air passage 13, and a second air passage 14. The first part 11 and the second part 12 are openably and closably combined together. The first air passage 13 communicates with the first part 11 and the second part 12, and the second air passage 14 runs through the second part 12.

In a specific embodiment, the first part 11 includes an upper housing 110, an upper support 111, a battery compartment 112, a main control board 113, and a first air inlet 114. The upper support 111 is mounted in the upper housing 110, and the battery compartment 112 is arranged on one side of the upper support 111.

In a specific embodiment, the second part 12 is provided with a smoke generation pot 122 loaded with a tobacco material, a second air inlet 120, and an air outlet 121. The smoke generation pot 122 is provided with third air holes 1220. The second air passage 14 runs through the second air inlet 120, the third air holes 1220 and the air outlet 121 in sequence.

As an example, the heating device 3 is arranged in the first part 11 and mounted on one side of the upper support 111 facing away from the battery compartment 112. The battery compartment 112 is provided with batteries to supply power to the main control board 113.

Figure 4:
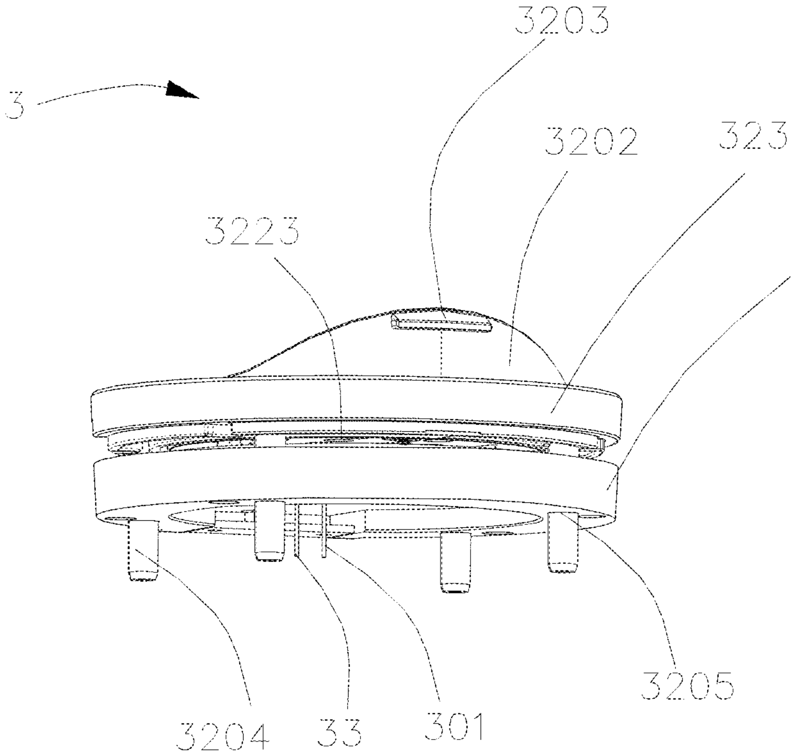
FIG. 4 is a schematic structural diagram of an electronic hookah with a sheet-like heating device according to the present disclosure.

In the embodiments of the present disclosure, as shown in FIG. 4, the heating device 3 includes a heating assembly 30, a protective cover 31, a temperature sensing device 33, and a heat insulation assembly 32. The heating assembly 30 and the temperature sensing device 33 are electrically connected with the main control board 113 of the main unit 1. One side of the heating assembly 30 is covered by the protective cover 31, and the temperature sensing device 33 is arranged on the opposite side of the heating assembly 30. The heating device 3 is used for heating the smoke generation pot 122, so that the tobacco material can produce smoke for smoking. The heating assembly 30 is used for generating heat, the temperature sensing device 33 is used for measuring the temperature of the heating assembly 30, the protective cover 31 is used for protecting the heating assembly 30, and the heat insulation assembly 32 is used for blocking the heat of the heating assembly 30 from being transferred to the outside.

In a specific embodiment, the temperature sensing device 33 may be a thermocouple, a NTC (negative temperature coefficient thermistor), a TCR (temperature coefficient resistor) or an infrared part, or temperature may be calculated directly by a software timing method without using the temperature sensing device 33. If the temperature sensing device 33 is used, when temperature changes, the resistance of the temperature sensing device 33 will also change, and the temperature change can be calculated by detecting the resistance change of the temperature sensing device 33. The resistance change of the temperature sensing device 33 may be converted into a digital signal by an analog-to-digital converter (ADC), and the digital signal is then processed by a microcontroller (MCU) to calculate temperature change. If the temperature sensing device 33 is not used, the temperature may be calculated directly by the software timing method. The software timing method calculates the temperature change by recording elapsed time. For example, a time interval between two time points may be recorded, and the temperature change is then calculated according to the change of the time interval. Although this method can be used for calculating the temperature change, the accuracy is low, and this method can be only used for rough temperature measurement.

In a specific embodiment, the temperature sensing device 33 may also be a temperature sensing line. The temperature sensing line is a line made of a temperature sensing material. When temperature changes, the temperature sensing material will undergo physical or chemical changes, causing the resistance value or other electrical parameters of the temperature sensing line change. The temperature sensing line may be used for temperature detection and control.

Figure 5:
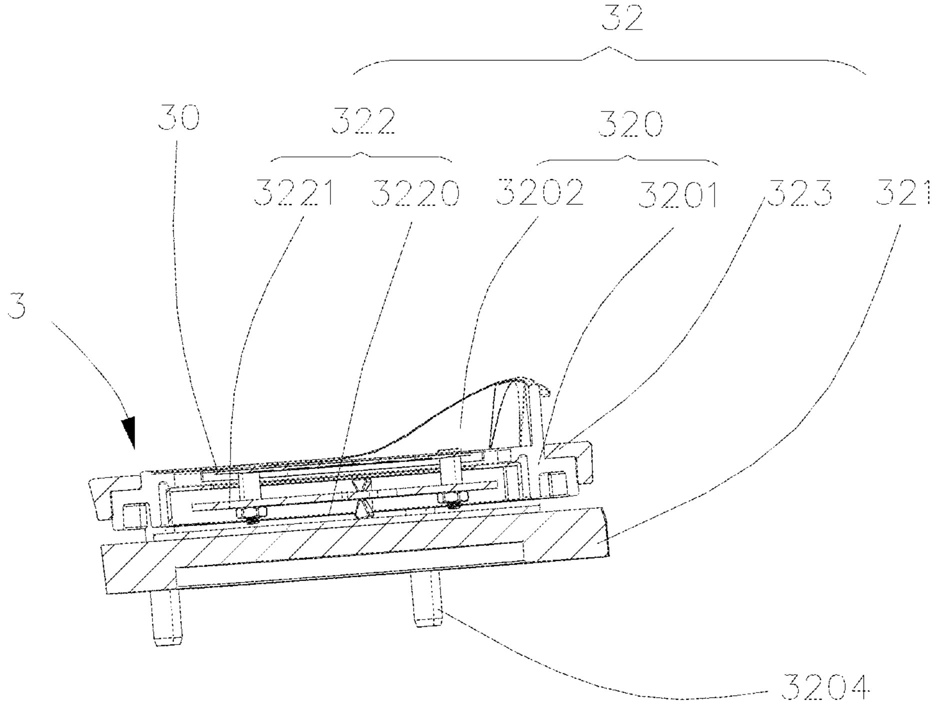
FIG. 5 is a schematic sectional view of the heating device shown in FIG. 4.
Figure 6:
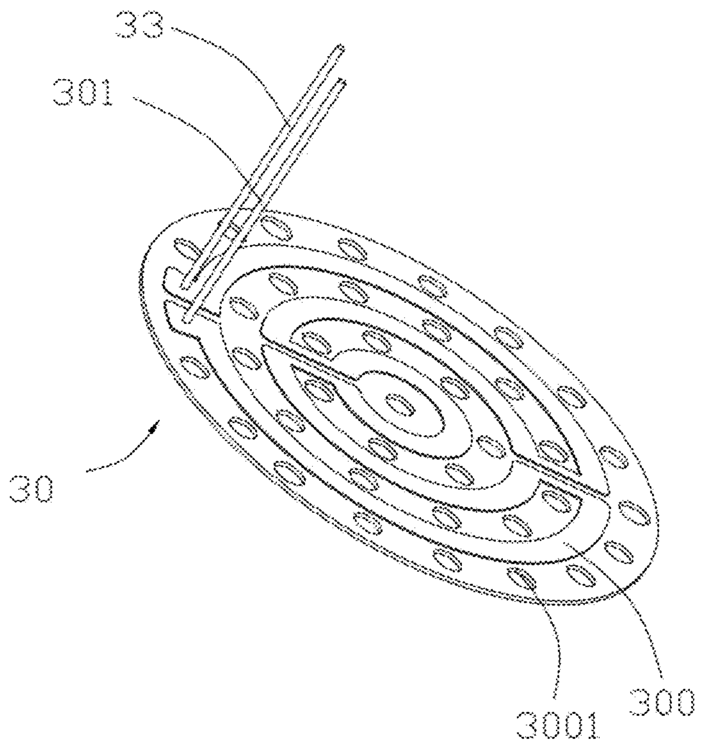
FIG. 6 is a schematic structural diagram of a sheet-like heating element of the electronic hookah with the sheet-like heating device according to the present disclosure.

In the embodiments of the present disclosure, as shown in FIGS. 4, 5 and 6, the heating assembly 30 includes a sheet-like heating element 300 substantially shaped like a disk and a connecting wire 301 extending from the sheet-like heating element 300 to the batteries. The heating assembly 30 is electrically connected with the main control board 113 via the connecting wire 301. The sheet-like heating element 300 is formed into a specific pattern by thick-film printing and low-temperature glaze firing. In the present embodiment, the sheet-like heating element 300 is in a planar spiral shape. In the present embodiment, the sheet-like heating element 300 is formed a semi-closed symmetrical pattern with gaps at the connecting wire 301 and the temperature sensing device 33. In the present embodiment, the sheet-like heating element 300 adopts a SUS430 super-thermal conductivity material as a heating material. In the present embodiment, the sheet-like heating element 300 is provided with a plurality of first air holes 3001, which are used for ventilation.

In a specific embodiment, the protective cover 31 is fixed on the heat insulation assembly 32 by fixing parts. The protective cover 31 covers one side of the sheet-like heating element and faces the smoke generation pot, so as to prevent the sheet-like heating element 300 from being directly exposed to the outside and damaged. In the present embodiment, the protective cover 131 is made of stainless steel. The protective cover 31 is shaped like a disk, which is adapted to the shape of the sheet-like heating element 300, so as to cover the sheet-like heating element 300. The protective cover 31 is also provided with a plurality of second air holes 310. The first air holes 3001, the second air holes 310, and the third air holes 1220 are located on a path through which the first air passage 13 passes. The first air passage 13 passes through the first air inlet 114, the first air holes 3001, the second air holes 310, the third air holes 1220 and the air outlet 121 in sequence.

In a specific embodiment, the first air holes 3001 of the sheet-like heating element 300 have the same design as the second air holes 310 of the protective cover 31, so that the first air holes 3001 can be aligned with the second air holes 310.

In the present embodiment, screws pass through the second air holes 310 at the edge of the protective cover 31 and the corresponding first air holes 3001 of the sheet-like heating element 300 in sequence, and are fixed on the first heat insulation sheet 3220 with nuts. Stainless steel tubes (not shown) are sleeved on the screws between the sheet-like heating element 300 and the first heat insulation sheet 3220 to prevent the screws from being damaged due to oxidation.

Figure 7:
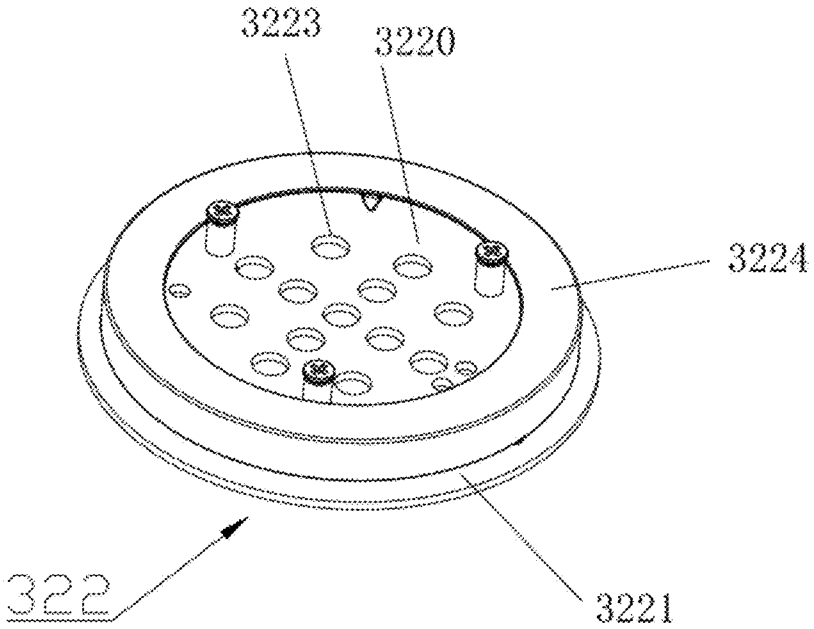
FIG. 7 is a schematic structural diagram of a mica sheet assembly of the electronic hookah with the sheet-like heating device according to the present disclosure.
Figure 8:
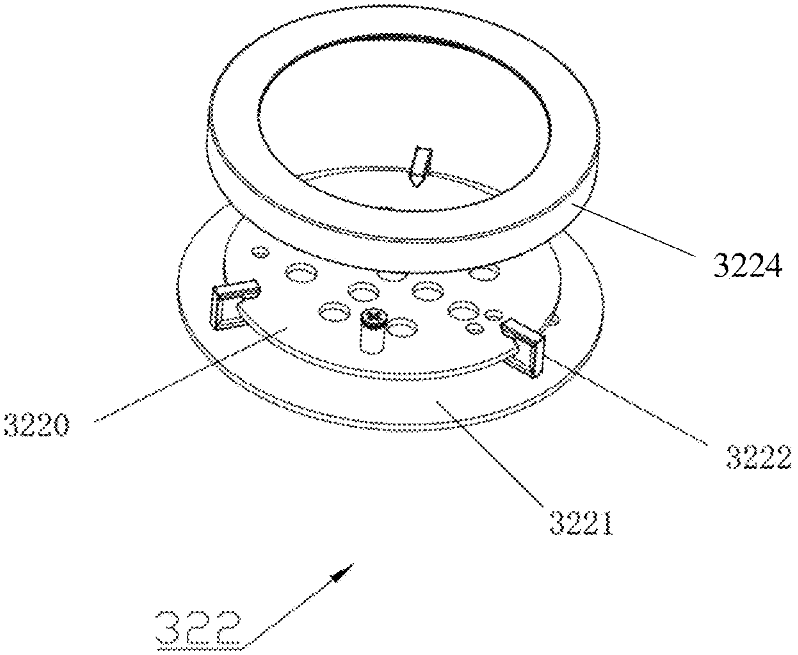
FIG. 8 is a schematic diagram of the disassembled structure of the mica sheet assembly shown in FIG. 7.

In a specific embodiment, as shown in FIGS. 7 and 8, the heat insulation assembly 32 includes a heat insulation support 320, a heat insulator 321, a mica sheet assembly 322, and a heat insulation cover 323. The mica sheet assembly 322 is located between the heat insulation support 320 and the heat insulator 321. The heat insulator 321 is arranged opposite to the heat insulation support 320. The heat insulation cover 323 surrounds the heat insulation support 320 and faces the protective cover 31.

In a specific embodiment, the heat insulator 321 is substantially shaped like a disk, and one side of the heat insulator 321 facing the mica sheet assembly 322 is sunken, thus forming a certain gap from the outside and further preventing heat from being transferred into the outside. A plurality of positioning holes 3205 and a plurality of fixing holes (not shown) are arranged at intervals near the edge of the heat insulator 321. The heat insulator 321 is made of silica gel.

In a specific embodiment, the heat insulation carrier 320 includes a circular heat insulation ring 3201 and a tongue-shaped protruding portion 3202 protruding from one side of the heat insulation ring 3201. A plurality of connecting pins 3204 extend from one side of the heat insulation ring 3201 facing away from the protruding portion 3202. The protruding portion 3202 protrudes toward the side opposite to the heat insulation cover 323, and fastening blocks 3203 of an opening and closing structure of the main unit 1 are arranged on the outer surface of the protruding portion 3202. The plurality of connecting pins 3204 are in one-to-one correspondence to a plurality of positioning holes 3205 and pass through the heat insulator 321 through the corresponding positioning holes 3205 to play a supporting role. The outer edge of the heat insulation carrier 320 is provided with a plurality of fixing holes.

In a specific embodiment, the heating assembly 30 is located in the middle of the heat insulation ring 3201 and surrounded by the heat insulation ring 3201. The sheet-like heating element 300 and the protective cover 31 are mounted in the heat insulation support 320, and the opposite sides of the sheet-like heating element 300 and the protective cover 31 are exposed out of the heat insulation support 320, respectively.

In the embodiments of the present disclosure, the fixing holes of the heat insulation support 320 are semicircular, adapted to the fixing holes of the heat insulation carrier 320. The heat insulation support 320 and the heat insulator 321 are fixed together through fixing parts and the corresponding fixing holes.

In a specific embodiment, the heat insulation cover 323 is an annular body, which covers the end surface of the heat insulation support 320 to further isolate the heat of the heating assembly 30 and also cover the fixing parts and gaps. In the present embodiment, the heat insulation cover 323 is made of silica gel. In the present embodiment, the bottom of the heat insulation cover 323 covers the end surface of the heat insulation support 320, vertically extending from the bottom outer edge to one side of the heat insulator 321 to surround the outer wall of the heat insulation support 320.

In a specific embodiment, the mica sheet assembly 322 includes a first heat insulation sheet 3220 and a second heat insulation sheet 3221 which are arranged in parallel and at intervals, supporting tubes 3222 located between the first heat insulation sheet 3220 and the second heat insulation sheet 3221, and a fixing frame 3224. The cross sections of the first heat insulation sheet 3220 and the second heat insulation sheet 3221 are round. The first heat insulation sheet 3220 is close to the heating assembly 30, and the second heat insulation sheet 3221 is close to the heat insulator 1321. The diameter of the second heat insulation sheet 3221 is greater than that of the first heat insulation sheet 3220. The first heat insulation sheet 3220 is provided with air holes 3223 for the ventilation of the heating assembly 30. The fixing frame 3224 is substantially shaped like a cover with a hollow top, with the top covering the first heat insulation sheet 3220 and the bottom being supported by the second heat insulation sheet 3221. In the present embodiment, the supporting tube 3222 includes a connecting tube (not shown) and a platform (not shown), where the platform extends from both ends of the connecting tube towards the first heat insulation sheet 3220, so that a notch is formed in the middle of the support tube 3222. The first heat insulation sheet 3220 is inserted in the notch, which makes the first heat insulation sheet 3220 more steady.

In a specific embodiment, as shown in FIG. 6, one end of the temperature sensing device 33 is bonded to the sheet-like heating element 300, and the other end of the temperature sensing device 33 is electrically connected to the main control board 113. The temperature sensing device 33 measures the temperature value of the sheet-like heating element 300 and transmits the temperature value to the main control board 113, so as to realize accurate temperature control. In the present embodiment, the temperature sensing device 33 is a K-type temperature sensing device. As a temperature sensor, the K-type temperature sensing device can measure the surface temperatures of liquid vapor, gas medium and solid in the range of 0° C. to 1300° C. in various production processes.

Although the preferred embodiments among the embodiments of the present disclosure have been described, those skilled in the art can make additional changes and modifications to these embodiments once they have learned the basic creative concept. Therefore, the appended claims are intended to be interpreted as including the preferred embodiments and all changes and modifications falling within the scope of embodiments of the present disclosure.

Finally, it should also be noted that in this document, relational terms, such as first and second, are merely used to distinguish one entity or operation from another entity or operation, and do not necessarily require or imply that there is any such actual relationship or order between these entities or operations. Moreover, the term "comprise", "include" or any other variant thereof herein is intended to cover non-exclusive inclusion, so that a process, method, article or terminal device including a series of elements includes not only those elements but also other elements not explicitly listed or elements inherent to such process, method, article or terminal device. Without more restrictions, the elements defined by the sentence "include a . . . " do not exclude the existence of other identical elements in the process, method, article or terminal equipment including the elements.

The electronic hookah with the sheet-like heating device provided by the present disclosure has been introduced in detail above, the specific examples are applied herein to elaborate the principle and embodiments of the present disclosure, and the illustration of the above embodiments are merely intended to offer help in understanding the method of the present disclosure and its core idea; moreover, for those skilled in the art, both the specific embodiments and the scope of application can be changed, and to sum up, the contents of the description should not be understood as a limitation on the present disclosure.

What is claimed is:

1. An electronic hookah with a sheet-like heating device, used for heating a tobacco material, and comprising a main unit, wherein the main unit is provided with a sheet-like heating element and a protective cover:

the protective cover is arranged on one side of the sheet-like heating element facing the tobacco material; and during heating, the sheet-like heating element uniformly conducts heat to the tobacco material through the protective cover and heats the tobacco material and surrounding air.

2. The electronic hookah with a sheet-like heating device according to claim 1, further comprising a second part for accommodating the tobacco material, wherein the main unit is connected with the second part; and the tobacco material is arranged opposite to the protective cover.

3. The electronic hookah with a sheet-like heating device according to claim 1, wherein the sheet-like heating element is made of a super-thermal conductivity material.

4. The electronic hookah with a sheet-like heating device according to claim 3, wherein the sheet-like heating element is made by thick-film printing and low-temperature glaze firing.

5. The electronic hookah with a sheet-like heating device according to claim 1, further comprising a heat insulation assembly, the heat insulation assembly comprising a heat insulation support and a heat insulator, wherein the sheet-like heating element and the protective cover are mounted in the heat insulation support, the heat insulator is arranged on one side of the heat insulation support and is disposed at a distance from the sheet-like heating element, and wherein the heat insulation assembly is provided in the main unit.

6. The electronic hookah with a sheet-like heating device according to claim 5, wherein a first heat insulation sheet and a second heat insulation sheet for heat insulation are arranged between the heat insulator and the heat insulation support.

7. The electronic hookah with a sheet-like heating device according to claim 1, wherein the sheet-like heating element comprises a temperature sensing device, and one end of the temperature sensing device is fixedly connected with the sheet-like heating element.

8. The electronic hookah with a sheet-like heating device according to claim 1, wherein the sheet-like heating element is provided with first air holes, and the protective cover is provided with second air holes.

9. The electronic hookah with a sheet-like heating device according to claim 2, wherein the sheet-like heating element is provided with first air holes, and the protective cover is provided with second air holes.

10. The electronic hookah with a sheet-like heating device according to claim 3, wherein the sheet-like heating element is provided with first air holes, and the protective cover is provided with second air holes.

11. The electronic hookah with a sheet-like heating device according to claim 4, wherein the sheet-like heating element is provided with first air holes, and the protective cover is provided with second air holes.

12. The electronic hookah with a sheet-like heating device according to claim 5, wherein the sheet-like heating element is provided with first air holes, and the protective cover is provided with second air holes.

13. The electronic hookah with a sheet-like heating device according to claim 6, wherein the sheet-like heating element is provided with first air holes, and the protective cover is provided with second air holes.

* * * * *